United States Patent

Aritsubo et al.

Patent Number: 5,421,593
Date of Patent: Jun. 6, 1995

[54] SHAFT SEAL DEVICE

[75] Inventors: Hirofumi Aritsubo; Toshihiko Fuse, both of Sanda, Japan

[73] Assignee: Nippon Pillar Packing Co., Ltd., Osaka, Japan

[21] Appl. No.: 102,282

[22] Filed: Aug. 5, 1993

[51] Int. Cl.6 .............................................. F16J 15/34
[52] U.S. Cl. ...................................... 277/65; 277/41; 277/74; 277/93 R
[58] Field of Search ...................... 277/38, 40, 41, 65, 277/74, 81 R, 93 R

[56] References Cited

U.S. PATENT DOCUMENTS

| | | | |
|---|---|---|---|
| 2,854,927 | 10/1958 | Berg | 277/74 |
| 3,199,145 | 8/1965 | Tiemersma | 277/74 X |
| 3,582,089 | 6/1971 | Amorese | 277/74 X |
| 3,770,179 | 11/1973 | McHugh | 277/65 X |
| 3,811,687 | 5/1974 | Honold et al. | 277/65 X |
| 4,095,806 | 6/1978 | Dempsey | 277/74 X |
| 4,130,287 | 12/1978 | Ritzie | 277/65 X |
| 5,058,905 | 10/1991 | Nosowicz et al. | 277/65 |
| 5,066,026 | 11/1991 | Heck et al. | 277/93 R X |
| 5,217,233 | 6/1993 | Pecht et al. | 277/65 |
| 5,217,234 | 6/1993 | Hornsby | 277/74 X |

FOREIGN PATENT DOCUMENTS 0578365 6/1959 Canada ...................... 277/74
1137197 12/1968 United Kingdom ............ 277/74

Primary Examiner—William A. Cuchlinski, Jr.
Assistant Examiner—John L. Beres
Attorney, Agent, or Firm—Griffin, Butler Whisenhunt & Kurtossy

[57] ABSTRACT

A shaft seal device comprises two mechanical seals for sealingly separating a sealed fluid region from an atmospheric region. A shaft is rotatable about an axis and extends through a casing from a sealed fluid region to an atmospheric region. The mechanical seals separate the sealed fluid region and the atmospheric region by a purge region formed between the mechanical seals. Each mechanical seal comprises a first seal ring fixed on the shaft and a second seal ring slidable in the axial direction and pressed against the first seal ring. The mechanical seal separating the sealed fluid region from the purge region is a contact type seal so that the fluid pressure of the sealed fluid region acts as a back pressure on the second seal ring. The mechanical seal separating the atmospheric region from the purge region is non-contact type seal so that the fluid pressure of the purge region acts as a back pressure on the second seal ring. The purge fluid region is charged with a gas such as nitrogen at a pressure lower than the pressure in the sealed fluid region.

8 Claims, 3 Drawing Sheets

SHAFT SEAL DEVICE

FIELD OF THE INVENTION

The present invention relates to a shaft seal device for use in fluid machines such as pumps. More particularly, the invention relates to a shaft seal device comprising two mechanical seals which sealingly separate a sealed fluid region from an atmospheric region by forming a purge region between them.

BACKGROUND OF THE INVENTION

FIG. 5 illustrates a prior art shaft double seal having two contact type mechanical seals 1a, 1b disposed in opposite directions. That is, in both mechanical seals stationary seal rings 2a, 2b are fixed relative to seal casing 5 and rotary seal rings 3a, 3b are slidable in the axial direction on rotary shaft 6, the seal rings 3a, 3b being pressed against stationary seal rings 2a, 2b by the thrust of springs 4a, 4b. The seal device is designed to sealingly separate the sealed fluid region A from the atmospheric region B by a purge fluid region C which is filled with a purge fluid L such as water or oil at an appropriate pressure. The term pressure as used herein means gauge pressure on the basis of atmospheric pressure.

In FIG. 5, the pressure P' of the purge fluid acts as a back pressure on the slidable seal rings 3a, 3b. Therefore, the purge fluid pressure P' is set higher than the fluid pressure P of the sealed fluid region by a specific amount $\Delta P$, where $P' = P + \Delta P$. This maintains appropriate contact between the seal rings 2a, 3a at the side of the sealed fluid region A. If the purge fluid pressure P' is lower than the sealed fluid pressure, the seal rings 2a, 3a cannot maintain appropriate contact. Therefore, the pressing force exerted by the spring 4a must be increased more than necessary.

However, in the mechanical seal 1a which provides the seal between sealed fluid region A and purge fluid region C, the purge fluid pressure P' must be set higher than the sealed fluid pressure P, and, when the sealed fluid is a volatile fluid or a low boiling point fluid such an ammonia, friction heat may break the fluid lubricating film between seal rings 2a, 3a. Once the seal is broken, purge fluid L leaks into the sealed fluid region A.

On the other hand, the mechanical seal 1b which seals the purge fluid region C from the atmospheric region B is a contact type seal. Therefore, its sealing function may be destroyed in high pressure conditions where the differential pressure $(P + \Delta P)$ between the regions B and C is extremely high. Thus, the device of FIG. 5 is, generally speaking, not reliable. Depending on the properties and pressure of the fluid in the sealed region, it may be preferable to use another form of sealing device. In addition the structure of the device is complicated and peripheral equipment is required for circulating the purge fluid L.

SUMMARY OF THE INVENTION

A primary object of the present invention is to provide a shaft seal device which is reliable and exhibits a good and stable sealing function under high pressure conditions and when the fluid in the sealed region is a volatile fluid or a fluid such as liquid ammonia having a low boiling point.

Another object of the invention is to provide a shaft seal device which is simple in construction and does not require a peripheral device for circulating the purge fluid.

Yet another object of the invention is to provide a shaft seal device for sealing between a casing and a shaft rotatable about an axis extending through the casing from a sealed fluid region to an atmospheric region, the shaft seal device comprising two sets of mechanical seals displaced relative to each other in the direction of the axis so as to sealingly separate the sealed fluid region from the atmospheric region by a purge region formed between the mechanical seals, each of the mechanical seals comprising a first seal ring fixed relative to one of a group of elements consisting of the casing and the shaft and a second seal ring slidably held by a second element of the group of elements for movement in the direction of the axis, the first mechanical seal comprising a contact type seal disposed between the sealed fluid region and the purge region so that a fluid pressure in the sealed fluid region acts as a back pressure on the second seal ring of the first mechanical seal, the second mechanical seal comprising a non-contact type seal disposed between the purge region and the atmospheric region so that a fluid pressure in the purge fluid region acts as a back pressure on the second seal ring of the second mechanical seal, the purge fluid region being charged with a purge gas at a pressure lower than the pressure in the sealed fluid region.

Other objects and advantages of the invention and the manner of making and using it will become obvious upon consideration of the following description and the accompanying drawings.

DESCRIPTION OF THE INVENTION

Figure 1:
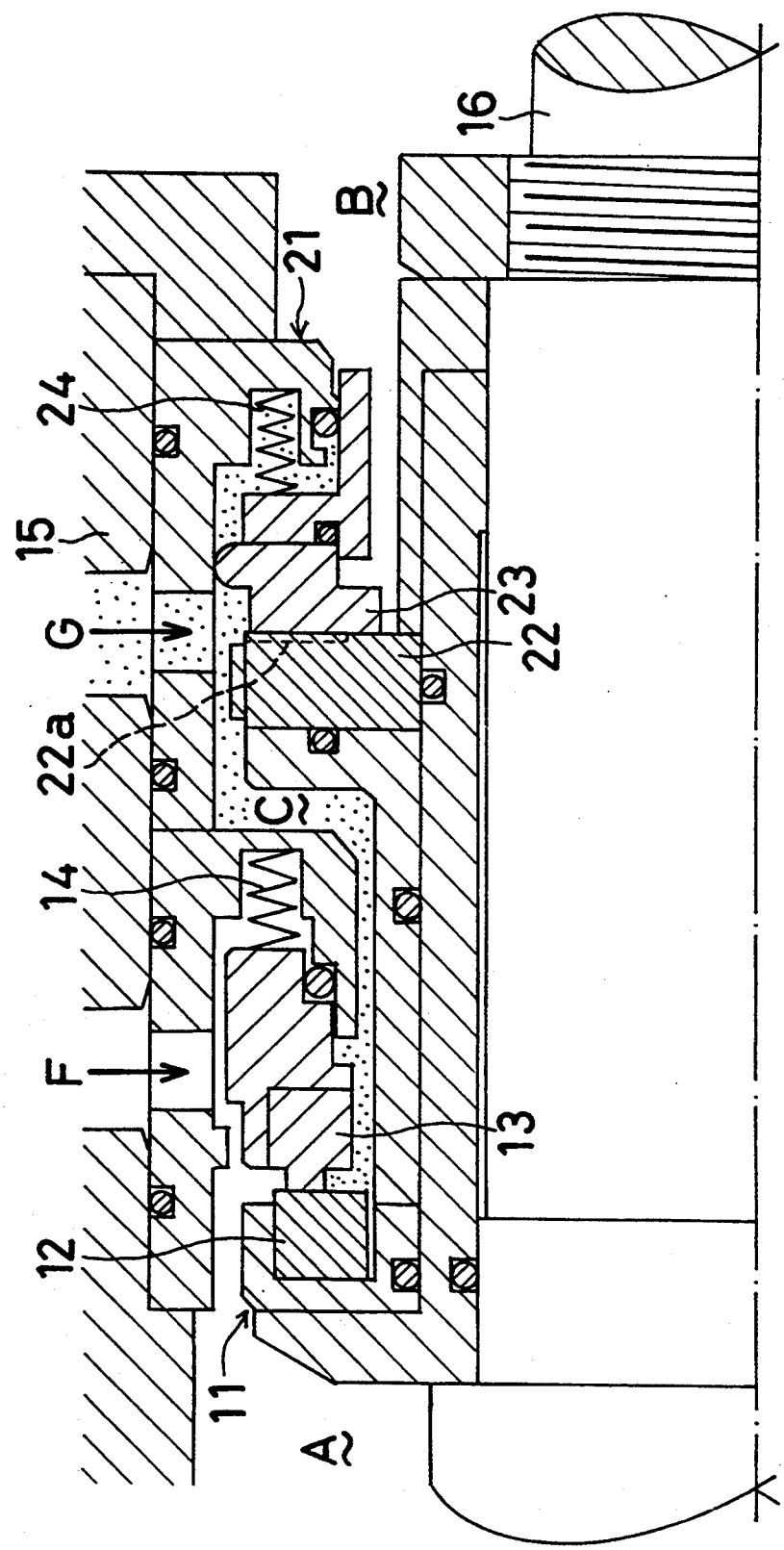
FIG. 1 is a cut-away sectional view showing a first embodiment of a shaft seal device of the invention.

FIG. 1 shows a preferred embodiment of a shaft seal device constructed in accordance with the principles of the present invention. A rotatable shaft 16 extends from a sealed fluid region A, through a seal casing 15 to an atmospheric region B. Two mechanical seals 11, 21 are positioned between casing 15 and shaft 16 and sealingly separate sealed fluid region A from atmospheric region B by a purge fluid region C formed between the seals.

Mechanical seal 11 comprises a first rotary seal ring 12 fixed to shaft 16 and a second stationary seal ring 13 held on casing 15 so as to be slidable in the direction of the axis of the shaft. Springs 14 press against the stationary seal ring 13 thus thrusting the stationary seal ring 13 against the rotary seal ring 12.

In the like manner, mechanical seal 21 comprises a first rotary seal ring 22 fixed to shaft 16 and a second stationary seal ring 23 held on casing 15 so as to be slidable in the direction of the axis of the shaft. Springs 24 press against the stationary seal ring 23 thus thrusting the stationary seal ring 23 against the rotary seal ring 22.

The first mechanical seal 11 comprises a contact type seal for sealing the sealed fluid region A from the purge fluid region C. During rotation of seal ring 12 relative to seal ring 13, one ring contacts the other ring 11 through a fluid lubricating film of the sealed fluid between the seal rings.

The second mechanical seal 21 is a non-contact type seal which sealingly separates the atmospheric region B from the purge fluid region C by relatively rotating the seal rings 22 and 23 in a non-contact state. To accomplish this, a dynamic pressure generating groove 22a is provided. Grove 22a is of spiral, T or rectangular form and opens to either the outer or inner circumferential side of seal ring 22.

The mechanical seals 11 and 21 are oriented in the same direction so that the stationary seal rings 13, 23 are located on the atmospheric region B side relative to rotary seal rings 12 and 22. Therefore, the fluid pressure P in sealed fluid region A acts as a back pressure on stationary seal ring 13, and the fluid pressure P' in the purge fluid region C acts as a back pressure on the seal ring 23.

Furthermore the purge fluid region C is charged with a purge gas G at a pressure P' where P'=P−ΔP. If the differential pressure Δ P between P and P' is too large, the load increases in the contact type mechanical seal 11 and there is a correspondingly greater heat generation. Therefore, when sealing a volatile or low boiling point fluid, the fluid lubricating film formed between seal rings 12, 13 may be broken. To avoid this, the differential pressure Δ P should be set in the range 0.5 to 10 kg/cm$^2$ depending on the sealed gas and gas pressure, and preferable should be set at 5 kg/cm$^2$. The purge gas G is selected according to the properties of the sealed gas and preferably an inert gas such as nitrogen is used.

As shown in FIG. 1, a flushing fluid F may be injected into the relatively rotating parts of the mechanical seal 11.

A seal device constructed according to FIG. 1 exhibits a good sealing function even if the fluid being sealed is at a high pressure or is a volatile fluid or has a low boiling point. In the mechanical seal 11 which forms the seal between the sealed fluid region A and the purge fluid region C, the seal rings 12, 13 may be maintained in appropriate contact since the sealed fluid pressure P acts as a back pressure on the sliding seal ring 13, even if the purge fluid pressure P' is lower than the sealed fluid pressure. Therefore, by keeping the purge fluid pressure P' at a low pressure, the load acting on the seal parts by the seal rings 12, 13 may be significantly decreased so that a favorable and stable seal function is exhibited regardless of pressure conditions and the properties of the fluid in the sealed region. In the event the seal function deteriorates, since the sealed fluid leaks to the region C side, invasion of the purge fluid into the region A side, as experienced by the prior art, is avoided.

Since the mechanical seal 21 is of the gas sealing, non-contact type, and since the purge gas pressure P' acts as a back pressure on the sliding seal rings 23, a good sealing function is exhibited even under a condition of high pressure. Furthermore, since the purge fluid G is a gas and the side of the mechanical seal 21 on the atmospheric region side is also sealed with gas, no peripheral device is required for circulating the purge fluid G.

Figure 2:
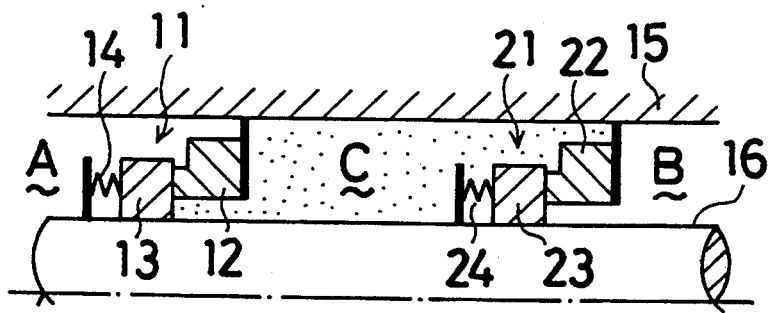
FIG. 2 is a cut-away schematic sectional view showing a second embodiment.

The invention is not limited to the embodiment of FIG. 1 and the embodiment shown in FIG. 1 may be modified without departing from the spirit and scope of the invention as defined in the appended claims. For example, FIG. 2 illustrates a second embodiment of the invention wherein the first seal rings 12 and 22 are fixed relative to the casing 15 and are disposed on the atmospheric region B side relative to the second seal rings 13, 23. The seal rings 13, 23 are slidable in the axial direction on the shaft 16.

Figure 3:
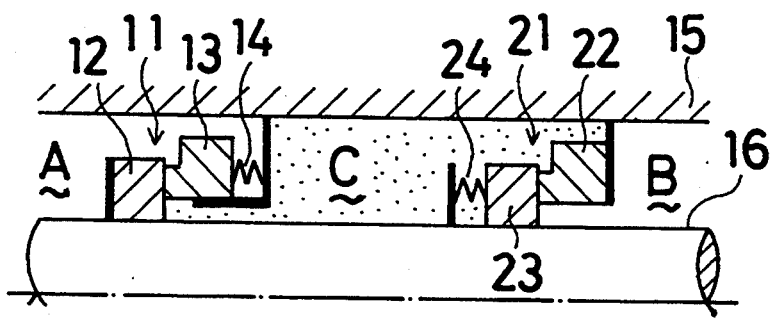
FIG. 3 is a cut-away schematic sectional view showing a third embodiment.

In the embodiment of FIG. 3, the first seal ring 12 of the first mechanical seal 11 is fixed relative to shaft 16. The second seal ring 13 is slidably mounted in the seal casing and, relative to seal ring 12, is disposed on the atmospheric region B side. In the second mechanical seal 21, the first seal ring 22 is fixed relative to the seal casing 15 and disposed on the atmospheric region B side relative to the second seal ring 23. The second seal ring 23 is slidably held on shaft 16.

Figure 4:
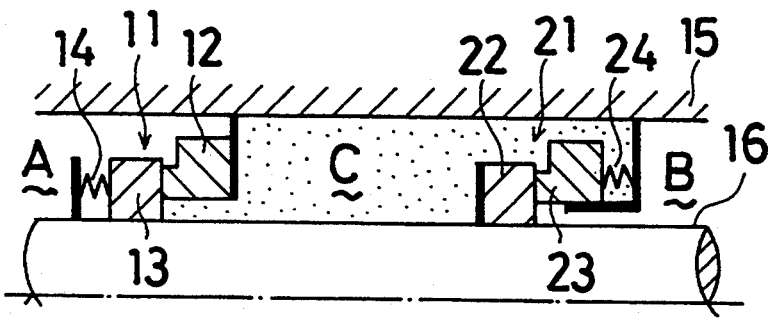
FIG. 4 is a cut-away schematic sectional view showing a fourth embodiment.
Figure 5:
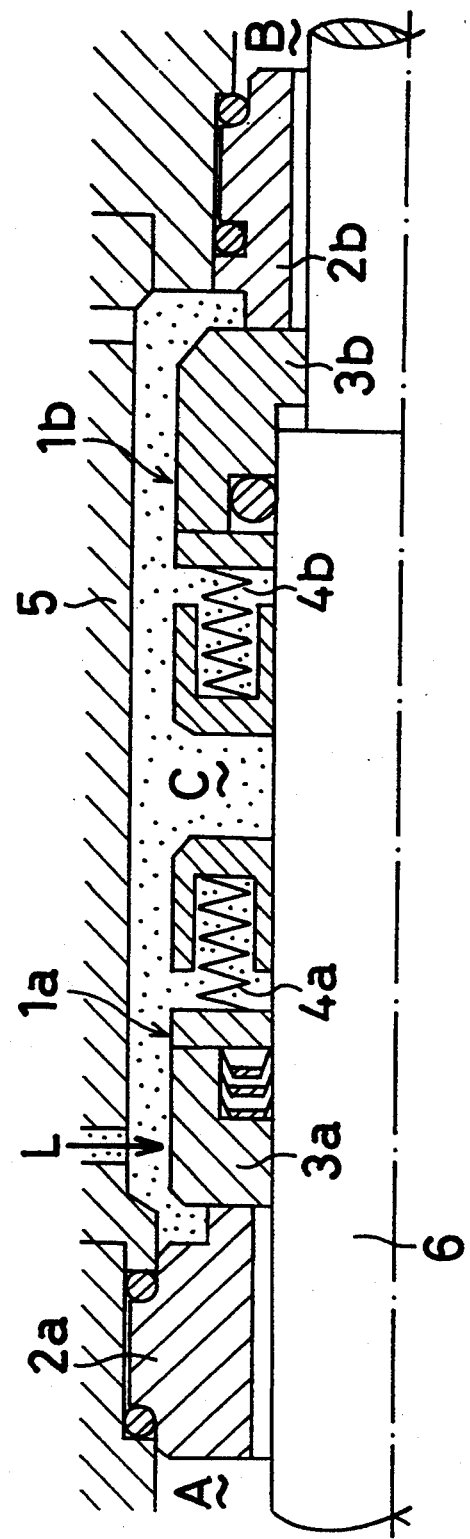
FIG. 5 is a cut-away sectional view showing a conventional device.

In the embodiment of FIG. 4, the first seal ring 12 is fixed relative to the casing 15 and disposed on the atmospheric region B side relative to the second seal ring 13. The second seal ring 13 is slidably held on shaft 16 so as to be movable in the direction of the shaft axis. The first seal ring 22 of the second mechanical seal 21 is fixed relative to the shaft 16. The second seal ring 23 is disposed on the atmospheric region B side relative to the first seal ring 22 and is supported on the casing 15 so as to be slidable in the direction of the axis of shaft 16.

We claim:

1. A shaft seal device for sealing between a casing and a shaft rotatable about an axis extending through said casing from a sealed fluid region to an atmospheric region, said shaft seal device comprising two mechanical seals displaced relative to each other in the direction of said axis so as to sealingly separate said sealed fluid region from said atmospheric region by a purge fluid region formed between said mechanical seals, each said mechanical seal comprising a first seal ring fixed relative to one of a group of elements consisting of said case and said shaft and a second seal ring slidably held by a second element of said group of elements for movement in the direction of said axis, said first mechanical seal comprising a contact type seal disposed between said sealed fluid region and said purge fluid region so that a fluid pressure in said sealed fluid region acts as a back pressure on the second seal ring of said first mechanical seal, said second mechanical seal comprising a non-contact type seal disposed between said purge fluid region and said atmospheric region so that a fluid pressure in said purge fluid region acts as a back pressure on the second seal ring of said second mechanical seal, said purge fluid region being charged with a purge gas at a pressure lower than the pressure in said sealed fluid region.

2. A shaft seal device as claimed in claim 1 wherein said first seal rings are fixed relative to said shaft and said second seal rings are slidably held by said casing for movement in the direction of said axis, said second seal rings being disposed on the atmospheric region side relative to said first seal rings.

3. A shaft seal device as claimed in claim 1 wherein said first seal rings are fixed relative to said casing and said second seal rings are slidably held on said rotary shaft for movement in the direction of said axis, said first seal rings being disposed on the atmospheric region side relative to said second seal rings.

4. A shaft seal device as claimed in claim 1 wherein the first seal ring of the first mechanical seal is fixed relative to said shaft, the second seal ring of said first mechanical seal is slidably held by said casing for movement in said axial direction, the second seal ring of the first mechanical seal being disposed on the atmospheric region side with respect to said first seal ring of said first mechanical seal, the first seal ring of the second mechanical seal is fixed relative to said casing, the second seal ring of said second mechanical seal is slidably held on said rotary shaft for movement in said axial direction, the first seal ring of the second mechanical seal being disposed on the atmospheric region side relative to the second seal ring of the second mechanical seal.

5. A shaft seal device as claimed in claim 1 wherein the first seal ring of the first mechanical seal is fixed relative to said casing, the second seal ring of said first mechanical seal is slidably held by said shaft for movement in said axial direction, said first seal ring of the first mechanical seal being disposed on the atmospheric region side with respect to said second seal ring of said first mechanical seal, the first seal ring of the second mechanical seal being fixed relative to said shaft, the second seal ring of the second mechanical seal being slidably held on said casing for movement in said axial direction, the second seal ring of said second mechanical seal being disposed on the atmospheric region side relative to the first seal ring of said second mechanical seal.

6. A shaft seal device as claimed in claim 1 wherein said purge fluid region is charged with a purge gas at a pressure 0.5 to 10 kg/cm$^2$ less than the pressure in said sealed fluid region.

7. A shaft seal device as claimed in claim 1 wherein said purge fluid region is charged with a purge gas at a pressure of 5 kg/cm$^2$ less than the pressure in said sealed fluid region.

8. A shaft seal device as claimed in claim 1 and further comprising means for injecting a flushing liquid toward contacting parts of the first and second seal rings of said first mechanical seal.

* * * * *